United States Patent
Green et al.

(10) Patent No.: US 8,199,012 B2
(45) Date of Patent: Jun. 12, 2012

(54) MICROWAVE CURTAIN SENSOR

(75) Inventors: Leslie Kendall Green, Applegate, CA (US); James Helland, Agoura Hills, CA (US); XiaoDong Wu, Roseville, CA (US)

(73) Assignee: Honeywell International Inc., Morristown, NJ (US)

(*) Notice: Subject to any disclaimer, the term of this patent is extended or adjusted under 35 U.S.C. 154(b) by 382 days.

(21) Appl. No.: 12/370,363

(22) Filed: Feb. 12, 2009

(65) Prior Publication Data

US 2010/0201518 A1  Aug. 12, 2010

(51) Int. Cl.
G08B 13/00 (2006.01)
G08B 13/24 (2006.01)

(52) U.S. Cl. .................. 340/554; 340/541; 340/552

(58) Field of Classification Search .............. None
See application file for complete search history.

(56) References Cited

U.S. PATENT DOCUMENTS

| | | | |
|---|---|---|---|
| 2,759,154 A * | 8/1956 | Smith et al. | 333/122 |
| 3,509,469 A * | 4/1970 | Strange | 340/870.25 |
| 5,047,995 A * | 9/1991 | Wells | 367/125 |
| 5,130,543 A | 7/1992 | Bradbeer | |
| 5,402,129 A | 3/1995 | Gellner et al. | |
| 2005/0057393 A1 | 3/2005 | Henftling et al. | |
| 2005/0225481 A1 | 10/2005 | Bonthron | |

FOREIGN PATENT DOCUMENTS

| | | |
|---|---|---|
| DE | 102 54 196 A1 | 6/2003 |
| GB | 2 182 517 A | 5/1987 |
| GB | 2182517 A * | 5/1987 |
| GB | 2 433 664 A | 6/2007 |

OTHER PUBLICATIONS

Lipsky, Stephen E., Microwave Passive Direction Finding, 2004, SciTech Publisher, Entire Reference is Pertinent, Especially Pertinent pp. 3-10, 29-33, 155-165.*
Extended European Search Report corresponding to European Application No. 10 15 3879, dated Aug. 3, 2010.
English translation of abstract of DE10254196 (A1).

* cited by examiner

*Primary Examiner* — Daniel Wu
*Assistant Examiner* — John Bamert
(74) *Attorney, Agent, or Firm* — Husch Blackwell

(57) ABSTRACT

A method and apparatus are provided for detecting an intruder. The method includes the steps of receiving an echo from opposing sides of a curtain line extending through the secure area, determining a difference between the received echoes, determining a phase difference of the signal and generating an alarm when the determined phase changes sign between successively received echoes.

11 Claims, 6 Drawing Sheets

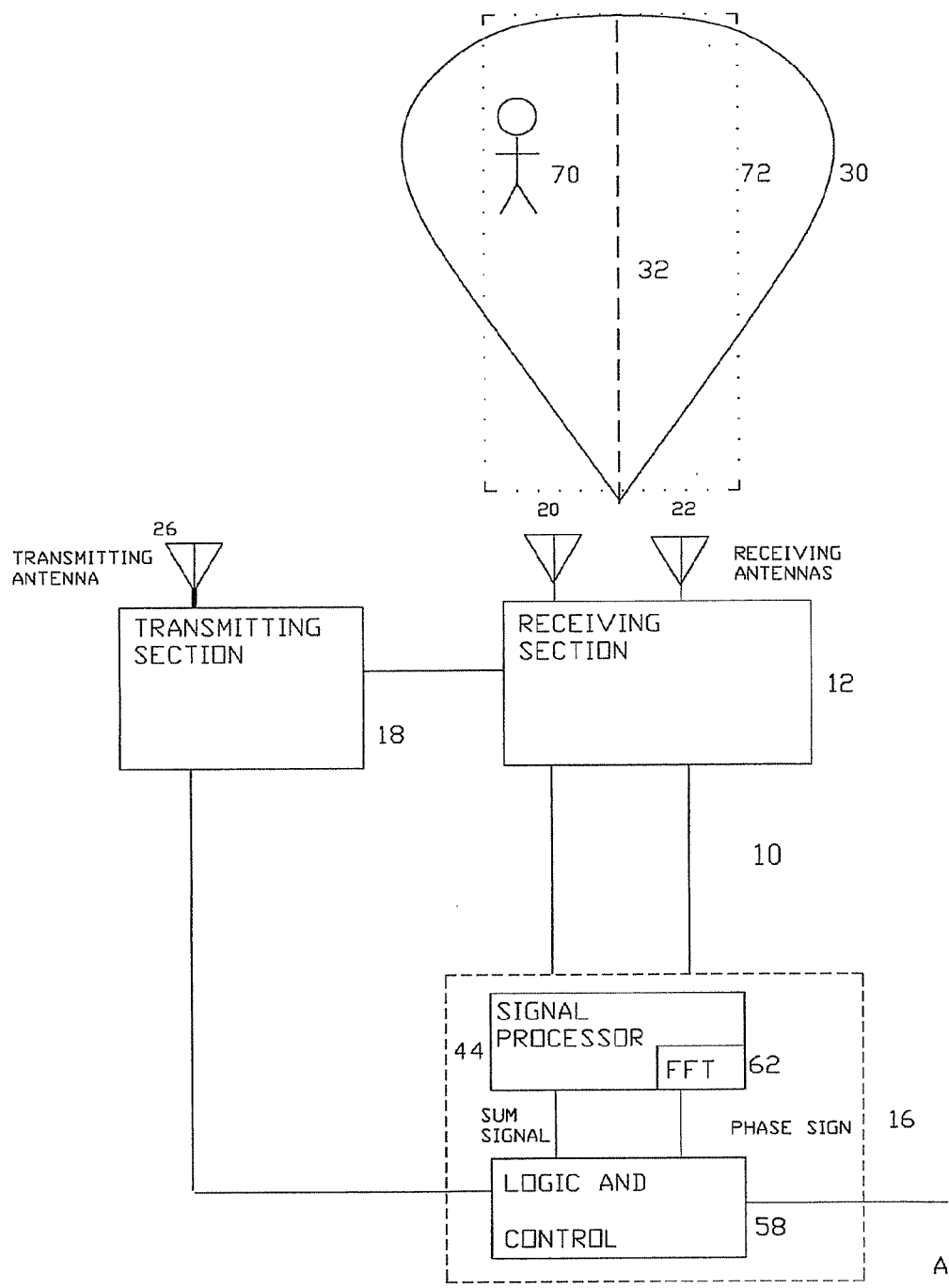

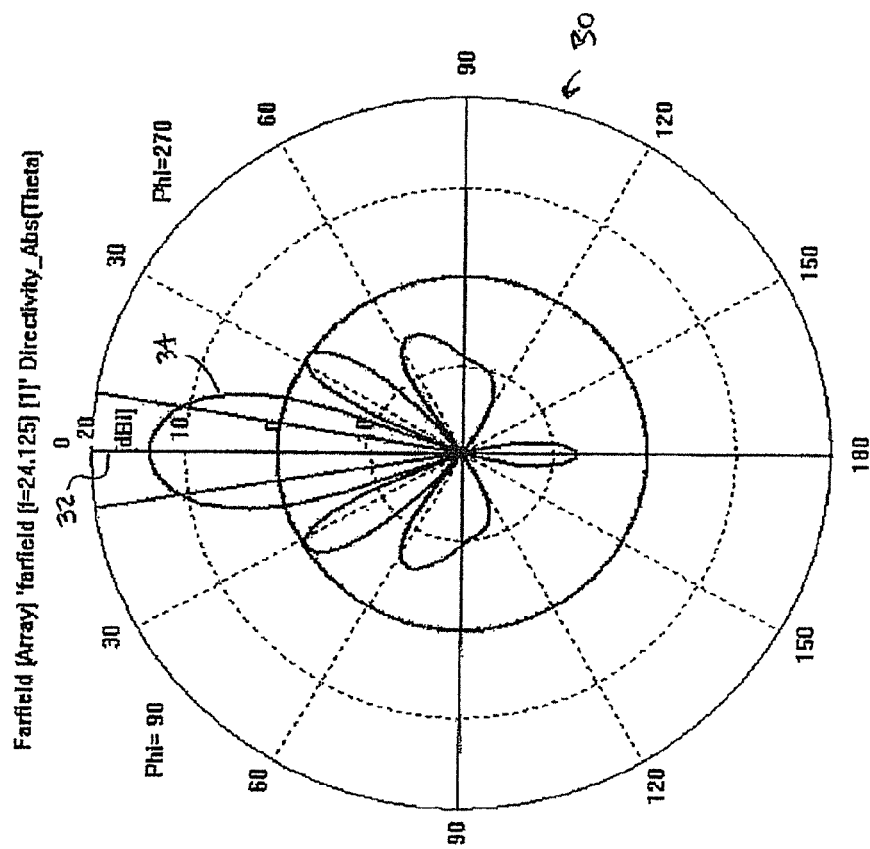
FIGURE 2. SUM PATTERN

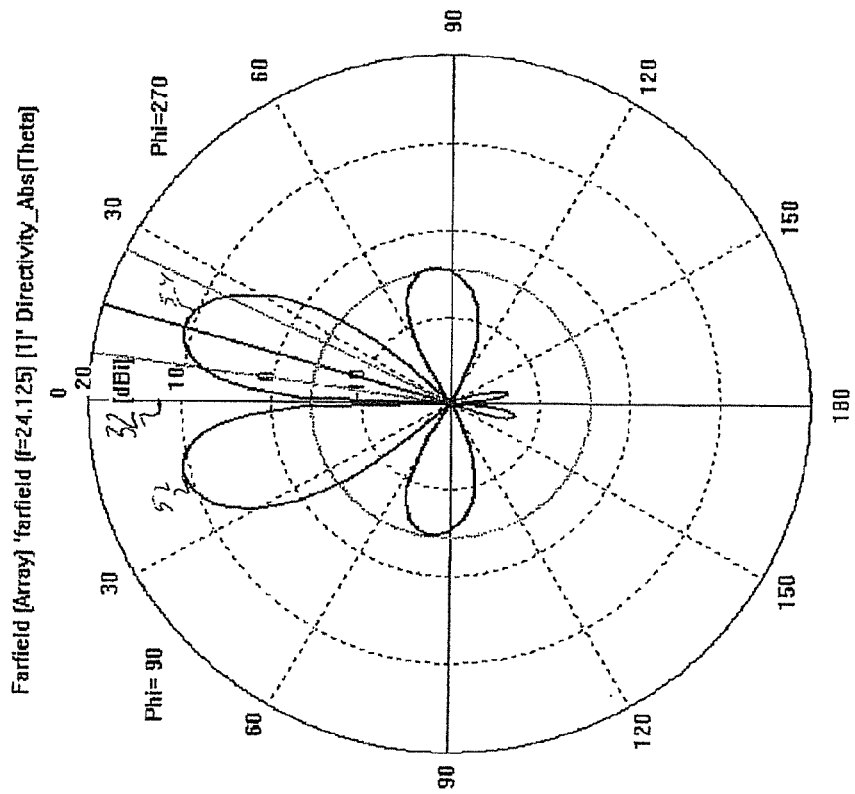
FIGURE 3. DIFFERENCE PATTERN

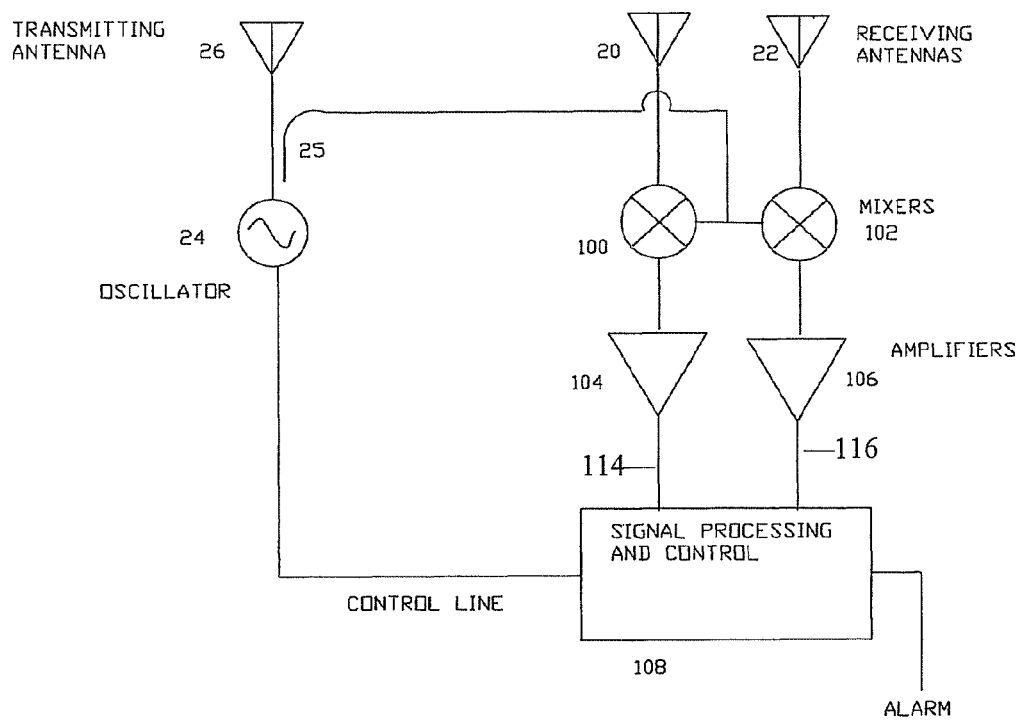

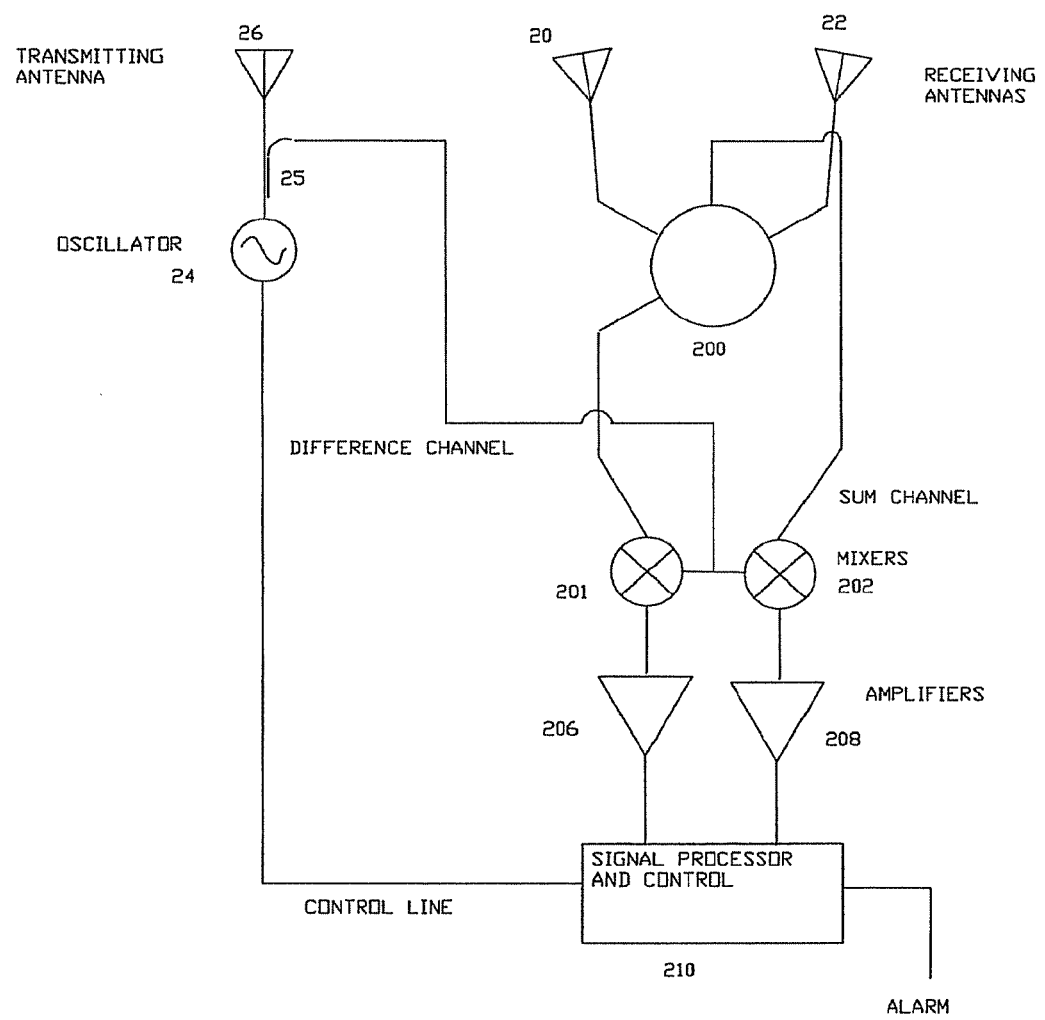

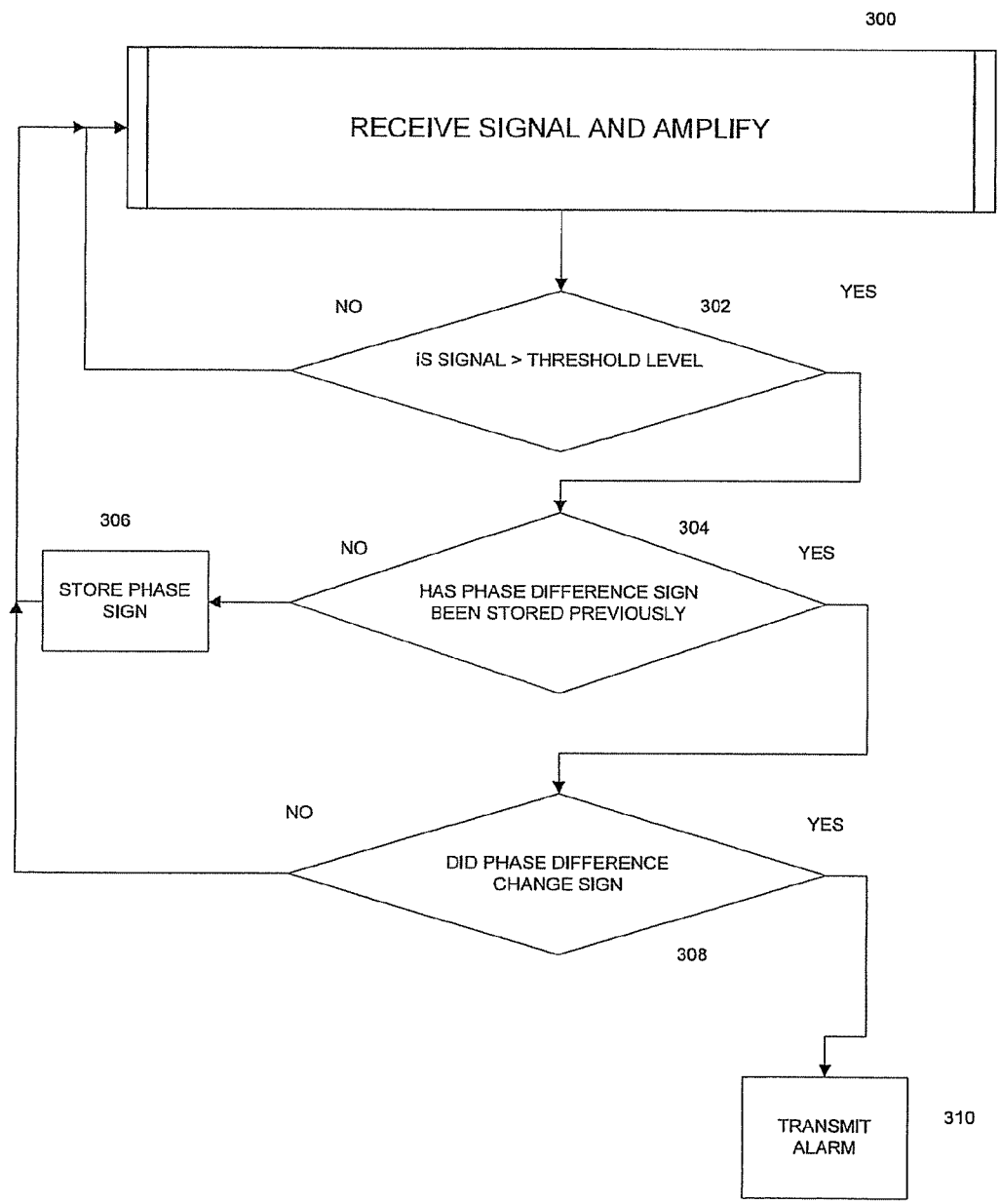

MICROWAVE CURTAIN SENSOR

FIELD OF THE INVENTION

The field of the invention relates to security systems and more particularly to motion sensors that detect motion that crosses in front of the sensor.

BACKGROUND OF THE INVENTION

Motion sensors are generally known. One type of motion sensor is referred to as a PIR (Passive InfraRed) sensor with a curtain lens. This sensor sends an alarm only when a temperature differential is detected that crosses in front of the sensor from one side to the other. A need exists to provide the same sensor using microwave technology instead of PIR technology. The microwave technology sensor can be used as a stand-alone sensor or as part of a Dual Technology sensor that includes both the PIR and microwave technologies. The Dual Technology sensor is a more robust sensor bettering the performance of either single technology sensor.

BRIEF SUMMARY OF THE INVENTION

According to one embodiment of the present invention, systems and methods of detecting an intruder are provided. In some methods, a first set of microwave echoes from opposing sides of a curtain line extending through a secure area can be received, a first phase difference between the received first set of microwave echoes can be determined, and a first sign of the determined phase difference can be determined. A second set of microwave echoes from opposing sides of the curtain line extending through the secure area can also be received, a second phase difference between the received second set of microwave echoes can be determined, and a second sign of the determined second phase difference can be determined. Then, an alarm can be generated when the first sign of the determined first phase difference is different than the second sign of the determined second phase difference.

BRIEF DESCRIPTION OF THE DRAWINGS

FIG. 1 is a block diagram of an intrusion detection system in accordance with an illustrated embodiment of the invention;

FIG. 2 is a sum radiation pattern of the two microwave antennas of FIG. 1;

FIG. 3 is a difference radiation pattern of the amplitude monopulse sensor.

FIG. 4 is block diagram of a phase monopulse sensor that may be used by the system of FIG. 1;

FIG. 5 is block diagram of an amplitude monopulse sensor that may be used by the system of FIG. 1; and FIG. 6 is a flow chart of process steps that may be executed by the system of FIG. 1.

DETAILED DESCRIPTION OF AN ILLUSTRATED EMBODIMENT

Security systems and automated manufacturing systems, as well as, other automated processes may employ microwave (MW) motion sensors for motion sensing and detection. MW motion sensors may include a microwave transceiver as an active device employing electromagnetic waves lower in frequency than visible light. MW motion sensors transmit a microwave signal toward a region to be monitored and in the event that movement of an object is detected within the region, a portion of the microwave signal may be reflected back (as an echo) from the object. The movement of the object may modulate the reflected signal due to the Doppler Effect. When a signal is reflected from a moving object (target), it is shifted in frequency. This shift in frequency is the measured Doppler Effect and is directly proportional to the target's velocity relative to the sensor. A maximum frequency shift occurs when the target is moving straight towards the sensor, and a minimum frequency shift is observed if the target is moving at a 90 degree angle to the MW signal.

In certain security applications, it is permissible to have motion in monitored areas, but an alarm should be sounded when the motion crosses from one side of a centerline of the motion sensor to the other side. Visually, this would be as if an intruder crosses through a vertical curtain or curtain line that extends out from the motion sensor.

The present invention provides a method of detecting motion of an object crossing from one side to the other of a line that extends out from the motion sensor. Described below are several means of detecting this crossing using Doppler Effect in a microwave technology motion sensor.

In a first illustrated embodiment of the invention, this detection is accomplished by using an Amplitude Monopulse technology. Two antennas are used for receiving the echo signal from the moving target. The transmitting antenna can either be the combination of the two antennas in a summing pattern fed with a circulator or can be a separate antenna as shown in FIGS. 4 and 5.

The antennas are substantially identical, but are pointed in directions that are slightly divergent. When the signals are received from the antennas, they can be summed to produce a pattern that has one beam (lobe) pointed directly away from the sensor (bore sight direction) and the signals can be subtracted to produce two beams, one on each side of the bore sight. By comparing the phase of the sum pattern with the difference pattern, it can be shown that the phase difference on one side of bore sight will have a phase angle 180 degrees different from the other side. This information can then be used by a logic circuit to determine when the object moves across the bore sight, i.e. when the phase changes from a plus to a minus, or minus to plus. The exact phase angle is not needed. The phase determination can either be done with hardware or software.

In a second illustrated embodiment of the invention, the detection is accomplished by using a Phase Comparison Monopulse Radar technology. This is also known as an Interferometer Radar, or a Simultaneous Phase Comparison Radar. It is similar to the Amplitude Monopulse Sensor except the two antennas are both pointed directly outwards from the sensor. In this case, the angle of the phase is determined by a phase detector or signal processor. The two signals can be added to produce the sum pattern. Only the phase of the signal would be different from one side to the other since if the motion of the object is on one side of bore sight, the signal from nearest antenna would lead the signal from the other antenna.

Both embodiments use the summation of the two channels to determine the signal level of the echo and use this level to make the determination of when the returning signal has reached a threshold level signifying a true target as opposed to a false target produced by noise, etc.

The phase detectors used in these two embodiments are somewhat complex since the returning Doppler signals are usually composed of several frequencies. Depending on the application, phase/frequency detectors may be used to detect the phase change or a Fourier Transform may be performed on each channel and the phase difference of the transforms can be compared.

FIG. 1 is a block diagram of an intrusion detection system 10 under an illustrated embodiment of the invention. The device 10 is used to detect the presence of a person 70, or other moving target that crosses a centerline, 32, perpendicular to the sensor within a secure area, 72.

Included within the security detection system 10 is a transmitting section, 18, a receiving section, 12, and a signal processing and control section, 16. Both embodiments detailed in FIG. 4 and FIG. 5 have common sections. The receiving sections exhibit the main differences. The transmitting section 18 consists of a microwave signal generator such as an oscillator feeding an antenna 26. The signal processing and control section 16 consists of a signal processing section 44, and a control and logic section 58. The signal processing section determines the amplitude and sign of the signal returned by the receiving antennas 20 and 22. The control and logic section 58, determine if an alarm condition has been met and controls the transmitting section, 18. It does this by determining that the reflected signal has the required strength and that the phase difference of the two signal channels experiences a sign change indicating a movement from one side of the centerline (bore sight) to the other side. Depending on how the phase difference is determined, the signal processing section 44 may include a Fast Fourier Transform section, 62. The signal processor and control section may be separate entities or they could all be incorporated into a microcontroller, DSP chip or ASIC.

The transmitting section 18 transmits a directional signal in the microwave frequency range that covers the area of interest 72. The transmitted radiation pattern, 30, is determined by the pattern of the transmitting antenna 26. As shown, the radiation pattern has a main lobe, 34, that is centered on the main transmission axis, 32. If the transmitting section doesn't have a separate antenna, but makes use of the two receiving antennas 20, 22 then the pattern will be as shown in FIG. 2, as determined by the array pattern of the receiving antennas 20 and 22 as is known by those skilled in the art.

The receiving section 12 consists of a number of amplifiers and filters necessary to provide the signal processor with signals in the proper amplitude and frequency range.

In the Amplitude Comparison Monopulse embodiment of FIG. 5, the receiving section consists of two antennas, 20 and 22 that point slightly away from the center line and feed a 180 degree hybrid coupler, 200, which adds and subtracts the two signals, producing a pattern with lobe 34 as shown in FIG. 2 for the sum and producing a pattern with lobes 52 and 54 as shown in FIG. 3 for the difference. These two channels then feed two separate mixers, 201 and 202. The transmitting section couples a signal, using the microwave coupler 25, from the oscillator, 24, signal to mix with the signals from the receiving antennas, 20 and 22. The signals coming from the mixers 201, 202 consist of the Doppler frequencies which are then amplified by amplifiers, 206 and 208 and are then sent to the signal processor and control 210. The processing follows the steps as shown in FIG. 6. It should be noted in this regard that while FIG. 6 could be considered as showing a flow chart, FIG. 6 also depicts the processing modules 300, 302, 304, 306, 308, 310 that accomplishes those steps.

In the Phase Comparator Sensor embodiment, FIG. 4, the two receiving antennas 20, 22 point in the same direction. The two signals from the antennas are mixed with the transmitted signal from a coupler 25 using mixers 100 and 102, which outputs the Doppler signals on lines 114 and 116. These Doppler signals are amplified by amplifiers 104 and 106 and feed the Signal and sign processor. When a reflected signal originates from one side of the center line, the signal will arrive at one antenna before it arrives at the other antenna. One antenna will be used as a reference. If the signal arrives at the reference antenna first it can be assigned a sign, but if it arrives at the other antenna first it will have the opposite sign. The Signal processor, 108, adds the two signals that will determine if the signal is of sufficient strength (i.e., exceeds a threshold) to indicate a true target. The phase difference of the signal will be analyzed to determine if the target is on the left side or the right side and then stored in a memory as a reference value. The next set of signals that arrived will go through the same process and the phase sign will be compared with the phase sign of the first, stored set. If there is a sign reversal, and alarm will be sent. This logic is shown in FIG. 6.

A specific embodiment of method and apparatus for detecting intruders has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of detecting an intruder, in a secure area, comprising:
   receiving a first set of microwave echoes from opposing sides of a curtain line extending through the secure area;
   determining a first phase difference between the received first set of microwave echoes;
   determining a first sign of the determined first phase difference;
   saving the determined first phase difference as a reference value;
   receiving a second set of microwave echoes from opposing sides of the curtain line extending through the secure area;
   determining a second phase difference between the received second set of microwave echoes;
   determining a second sign of the determined second phase difference; and
   generating an alarm when a sign of the reference value is different than the second sign of the determined second phase difference.

2. The method of detecting the intruder as in claim 1 further comprising summing the received first set of microwave echoes and summing the received second set of microwave echoes.

3. The method of detecting the intruder as in claim 2 further comprising comparing a sum of the received first set microwave echoes with a threshold value and comparing a sum of the received second set of microwave echoes with the threshold value.

4. An apparatus for detecting an intruder, in a secure area, comprising:
   a signal processing comparator that receives first and second sets of echoes from opposing sides of a curtain line extending through the secure area;
   first and second phase differences determined by the signal processing comparator between the first and second sets of echoes from opposing sides of the curtain line, the first phase difference saved in the signal processing comparator as a reference value; and a signal processor that detects the intruder when a sign of the reference value is different than a sign of the second phase difference.

5. The apparatus for detecting the intruder as in claim 4 further comprising first and second echo sums determined by adding the first and second sets of echoes from the opposing sides of the curtain line.

6. The apparatus for detecting the intruder as in claim 4 further comprising a signal processing unit that compares the first and second echo sums.

7. The apparatus for detecting the intruder as in claim 6 wherein the signal processing unit further comprises an amplitude monopulse sensor.

8. The apparatus for detecting the intruder as in claim 6 wherein the signal processing unit further comprises a phase monopulse sensor.

9. An apparatus for detecting an intruder, in a secure area, comprising:
    circuitry that receives a first set of microwave echoes from opposing sides of a curtain line extending through the secure area;
    circuitry that determines a first phase difference between the received first set of microwave echoes;
    circuitry that determines a first sign of the determined first phase difference;
    circuitry that saves the determined first phase difference as a reference value;
    circuitry that receives a second set of microwave echoes from opposing sides of the curtain line extending through the secure area;
    circuitry that determines a second phase difference between the received second set of microwave echoes;
    circuitry that determines a second sign of the determined second phase difference; and
    circuitry that generates an alarm when a sign of the reference value is different than the second sign of the determined second phase difference.

10. The apparatus for detecting the intruder as in claim 9 further comprising circuitry that sums the received first set of microwave echoes and circuitry that sums the received second set of microwave echoes.

11. The apparatus for detecting the intruder as in claim 10 further comprising circuitry that compares a sum of the received first set of microwave echoes with a threshold value and circuitry that compares a sum of the received second set of microwave echoes with the threshold value.

* * * * *